US008881107B2

(12) United States Patent
Bradley et al.

(10) Patent No.: US 8,881,107 B2
(45) Date of Patent: Nov. 4, 2014

(54) AUTOMATIC MEMORY LEAK DETECTION

(75) Inventors: Benjamin W. Bradley, Seattle, WA (US); Calvin Hsia, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 406 days.

(21) Appl. No.: 13/216,275

(22) Filed: Aug. 24, 2011

(65) Prior Publication Data
US 2013/0054923 A1 Feb. 28, 2013

(51) Int. Cl.
G06F 12/00 (2006.01)
G06F 11/36 (2006.01)
G06F 11/07 (2006.01)
G06F 12/02 (2006.01)

(52) U.S. Cl.
CPC ........ G06F 11/3636 (2013.01); *G06F 11/3664* (2013.01); *G06F 2201/86* (2013.01); G06F 11/073 (2013.01); *G06F 12/0253* (2013.01)
USPC ........... 717/124; 717/128; 711/154; 711/170; 711/217; 714/42

(58) Field of Classification Search
None
See application file for complete search history.

(56) References Cited

U.S. PATENT DOCUMENTS

| | | | |
|---|---|---|---|
| 5,809,554 A | 9/1998 | Benayon | |
| 5,920,876 A | 7/1999 | Ungar | |
| 5,949,972 A | 9/1999 | Applegate | |
| 6,125,434 A | 9/2000 | Willard et al. | |
| 6,560,773 B1 | 5/2003 | Alexander, III et al. | |
| 6,643,753 B2 | 11/2003 | Avner | |
| 6,658,652 B1 | 12/2003 | Alexander | |
| 6,728,907 B1 | 4/2004 | Wang et al. | |
| 6,782,462 B2 | 8/2004 | Marion et al. | |
| 6,889,297 B2 | 5/2005 | Krapp et al. | |
| 7,089,460 B2 | 8/2006 | Fu | |
| 7,111,294 B2 | 9/2006 | Steensgaard | |
| 7,200,731 B2 | 4/2007 | Raut | |
| 7,284,107 B2 | 10/2007 | Willman | |
| 7,487,321 B2 | 2/2009 | Muthiah et al. | |
| 7,500,077 B2 | 3/2009 | Krauss | |
| 7,500,079 B2 | 3/2009 | Becker | |
| 7,506,129 B2 | 3/2009 | Raut | |
| 7,577,943 B2 | 8/2009 | Chilimbi et al. | |
| 7,716,648 B2 | 5/2010 | Vaidyanathan et al. | |

(Continued)

OTHER PUBLICATIONS

Xie, et al., "Context and Path sensitive Memory Leak Detection", Retrieved at <<http://citeseerx.ist.psu.edu/viewdoc/download-?doi=10.1.1.88.2239&rep=rep1&type=pdf>>, In the proceedings of the 10th European software engineering conference held jointly with 13th ACM SIGSOFT international symposium on Foundations of software engineering, vol. 30, Issue 5, Sep. 5-9, 2005, pp. 115-125.

(Continued)

*Primary Examiner* — Matthew Bradley
*Assistant Examiner* — Alan Otto
(74) *Attorney, Agent, or Firm* — Kevin Sullivan; Kate Drakos; Micky Minhas

(57) ABSTRACT

Memory leak detection can be automated by assigning and recording an increasing sequence number to each memory allocation requested by an action. Call stacks associated with the action are also recorded. Several repetitions of the action can be executed. Allocations that occur in each action and that have similar or matching callstacks are defined as leaks. Allocations that do not have matches can be ignored.

20 Claims, 5 Drawing Sheets

(56) References Cited

U.S. PATENT DOCUMENTS

| | | | |
|---|---|---|---|
| 7,761,852 B2 | 7/2010 | Gilgen | |
| 7,774,741 B2 * | 8/2010 | Sridharan et al. | 717/100 |
| 7,827,538 B2 | 11/2010 | Trotter | |
| 7,870,358 B2 | 1/2011 | Yang | |
| 7,908,454 B2 | 3/2011 | Leung | |
| 2002/0116573 A1 | 8/2002 | Gold | |
| 2005/0081190 A1 | 4/2005 | Betancourt | |
| 2006/0195823 A1 | 8/2006 | Bentolila | |
| 2009/0328007 A1 * | 12/2009 | Chen et al. | 717/128 |
| 2010/0031238 A1 | 2/2010 | Li et al. | |

OTHER PUBLICATIONS

Xu, et al., "Path and Context Sensitive Inter-procedural Memory Leak Detection", Retrieved at <<http://lcs.ios.ac.cn/~xzx/memleak.pdf>>, Proceedings of the 2008 the Eighth International Conference on Quality Software, 2008, pp. 9.

Binbin Qu, et al; Memory leak dynamic monitor based on HOOK technique; Dec. 2009.

Detours; Microsoft Research; May 13, 2011.

ICorProfilerCallback Interface; May 13, 2011.

Umdhtools.exe_How to use Umdh.exe to find Memory Leaks; Article ID 268343; Last Review Apr. 25, 2007.

Calvin Hsia, Examin.Net Memory Leaks; MSDN Blogs; Apr. 11, 2008.

SOS.dll; SOS Debugging extension; May 13, 2011.

Kiyokuni Kawachiya, et al; Analysis and Reduction of Memory Ineffeciencies in Java Strings; Oct. 19-23, 2008.

Kiyokuni, Kawachiya, et al; An Efficient Heap Management Technique with Minimum Fragmentation and Auto Compaction; Jul. 29, 2010.

Mark Russinovich and Bryce Cogswell; VMMap v3.03; May 13, 2011.

Maebe, Jonas et al; Precise Detection of Memory Leaks, 2004, pp. 1-7.

Office Action mailed Dec. 20, 2013, in U.S. Appl. No. 13/217,222, 19 pages.

Office Action mailed Jan. 7, 2014, in U.S. Appl. No. 13/217,224, 22 pages.

Office Action mailed Jun. 20, 2014, in U.S. Appl. No. 13/217,224, 22 pages.

Notice of Allowance mailed Jul. 18, 2014, in U.S. Appl. No. 13/217,224, 8 pages.

Office Action mailed Aug. 28, 2014, in U.S. Appl. No. 13/217,222, 23 pages.

* cited by examiner

AUTOMATIC MEMORY LEAK DETECTION

CROSS-REFERENCE TO RELATED APPLICATIONS

The application is related in subject matter to co-pending U.S. patent application Ser. No. 13/217,222 entitled, "MEMORY ALLOCATION TRACKING", filed on Aug. 24, 2011, the entirety of which application is incorporated herein by reference. The application is related in subject matter to co-pending U.S. patent application Ser. No. 13/217,224 entitled, "MEMORY ALLOCATION ANALYSIS", filed on Aug. 24, 2011, the entirety of which application is incorporated herein by reference.

BACKGROUND

Individual application programs typically run on a computer as a process administered by an operating system. A program can call the operating system (OS) to allocate memory. Sometimes, the program that makes the request to the OS for a memory allocation is responsible for freeing the memory it has requested. Alternatively, a garbage collector or garbage collection service can free unused memory. Repeatedly allocating memory that is not freed (referred to as a memory leak) can lead to abnormal program termination. Hence finding and fixing code that leaks memory can be advantageous. While tools that track memory allocations in a given process are known, known tools do not typically identify allocations that are not freed or the actor that allocated the unfreed allocations. Moreover, some tools are limited to a single type of memory and/or provide incomplete or partial information about the allocations.

SUMMARY

An action that is responsible for leaking memory can be identified by intercepting all calls to the operating system that request a memory allocation and by intercepting all calls to the operating system that request allocated memory to be freed. When a memory allocation request is intercepted, the allocation request can be logged and tagged with information including a sequence number and the call stack associated with the memory allocation associated with the sequence number. When a request to free allocated memory is intercepted, the tag for the associated memory allocation can be discarded. Hence only leaked memory will be alive and have a tag after the action completes. The sequence number assigned to each memory allocation can be a sequential number so that a memory allocation that occurs at time $t_0$ will have a smaller sequence number than a memory allocation that occurs at time $t_1$ when time $t_0$ is less than time $t_1$. That is, the sequence number can be incremented with each new memory allocation. This enables allocations to be ordered in time.

The action can be repeated n times and the sequence numbers at the beginning and at the end of each execution of the action can be recorded. After the action has been repeated n times, the recorded information can be analyzed. First, allocations that occurred within the time period defined by the start and end sequence number for each repetition of the action can be grouped together. Then identical or substantially similar callstacks from each time period can be grouped together and identified as a leak. The analyzed information can be provided to a user via a user interface to automate identification of an action associated with leaked memory.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

A memory leak can be defined as failing to release allocated memory. If a particular action is leaking memory, then every time the action is repeated, memory will be allocated and then leaked. Because the memory is allocated by the same or nearly the same code path every time for the action, the callstack for the memory allocations will be the same or substantially similar every time the action is performed.

In accordance with aspects of the subject matter disclosed herein, a sequence number assigned to each memory allocation identifies when in time the memory allocation occurred. The sequence number, the callstack associated with the memory allocation and an identifier that identifies the action that allocated the memory can be recorded while the action is repeated some number n of times. By recording this information, allocations that occurred during each action and that have similar or matching callstacks can be determined, grouped together and reported as memory leaks. This information can be used to suggest areas in source code to investigate to determine the cause of the memory leak. Allocations without similar or matching callstacks can be ignored. Aspects of the subject matter described herein are described in more detail in co-pending U.S. patent application Ser. No. 13/217,222 entitled, "MEMORY ALLOCATION TRACKING", the entirety of which application is incorporated herein by reference and in co-pending U.S. patent application Ser. No. 13/217,224 entitled, "MEMORY ALLOCATION ANALYSIS", the entirety of which application is incorporated herein by reference.

Automatic Memory Leak Detection

Figure 1:
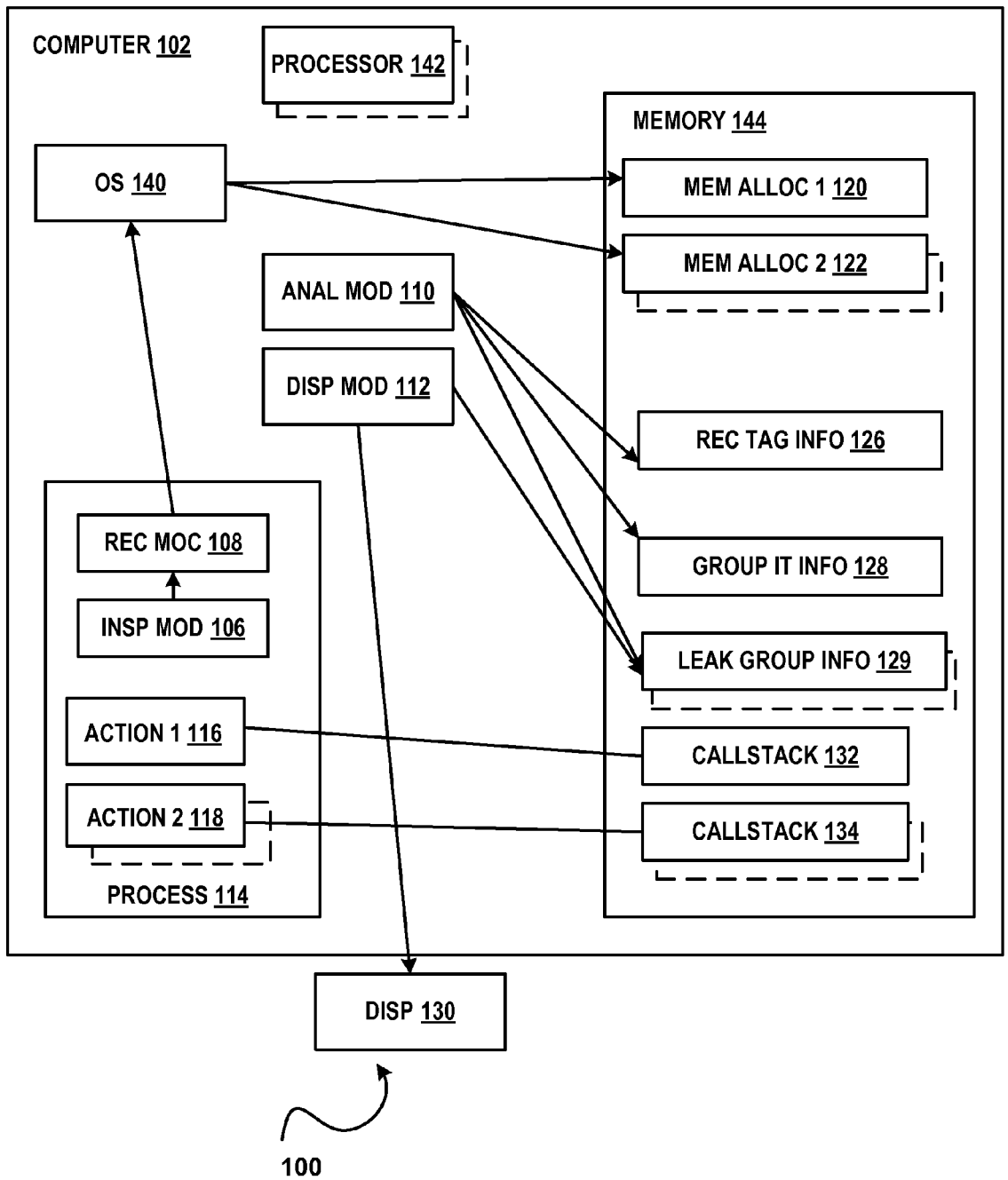
FIG. 1 illustrates an example of a system 100 that can automate memory leak detection in accordance with aspects of the subject matter disclosed herein.

FIG. 1 illustrates an example of a system 100 that automates memory leak detection in accordance with aspects of the subject matter disclosed herein. All or portions of system 100 may reside on one or more computers such as the computers described below with respect to FIG. 3. System 100 may execute on a software development computer such as the software development computer described with respect to FIG. 4. System 100 or portions thereof may execute within an IDE or may execute outside of an IDE. The IDE can be an IDE such as the one described with respect to FIG. 4 or can be any other IDE. All or portions of system 1100 may be implemented as a plug-in or add-on.

System 100 may include one or more computers or computing, devices such as a computer 102 comprising: one or more processors such as processor 142, etc., a memory such as memory 144, an operating system such as operating system 140, one or more modules such as inspection module 106 that inspects memory 144 while a process such as process 114 is executing, one or more modules such as recording module 108 that records tags associated with memory allocations, one or more modules such as analysis module 110 that analyzes the recorded information and one or more modules such as displaying module 112 that displays results of the analysis.

In operation, a process such as process 114 can be initiated on computer 102. Process 114 can include one or more actions such as action 1 116, action 2 118 and so on. An action such as action 1 116 can be repeated n times. Action 1 116 may make one or more calls to the operating system 140 requesting memory allocations. For example, action 1 116 may make a call at $t_0$ requesting a first memory allocation, action 1 116 may make another call $t_1$ requesting a second memory allocation and so on. A first memory allocation request can be a request for the same amount of memory or can be a request for a different amount of memory than the second memory allocation. In response to receiving a memory allocation request, operating system 140 may allocate the requested memory. For example, in response to receiving the first request for memory allocation at time $t_0$, time $t_0$<time $t_1$, OS 140 may allocate memory allocation 1 120. In response to receiving the second request for memory allocation at $t_1$, OS 140 may allocate memory allocation 2 122 and so on. Thus, the starting and ending sequence number assigned to memory allocations can delimit a range of sequence numbers that define particular iteration of an action.

Inspection module 106 may monitor process 114 and may intercept each call made by an action (e.g., action 1 116 requesting an allocation of memory. For each intercepted call, inspection module 106 may assign a sequence number to the memory allocation. The sequence number assigned to the memory allocation can be an increasing sequential number (e.g., 1, 2, 3, . . . ) so that memory allocations can be ordered with respect to time (e.g., a memory allocation with an assigned sequence number of "3" occurred before a memory allocation with an assigned sequence number of "4"). Each action can be associated with a callstack. For example, in FIG. 1 action 1 116 is associated with a first callstack, callstack 132 and action 2 118 is associated with a second callstack, callstack 134, etc. A call stack is a data structure that stores information about the active subroutines of a computer program. A call stack can be used to keep track of the point to which each active subroutine is to return control when it finishes executing. An active subroutine is one that has been called but has not completed execution. As active subroutines may be nested to any level (including recursive nesting): the stack structure enables the subroutine to return to the correct location. If, for example, a first subroutine calls a second subroutine from one or more places in the code path, the second subroutine can know where to return when it completes by retrieving the return address from the call stack because the address following the call instruction, the return address, has been pushed onto the call stack when the call to the second subroutine is made.

Recording module 108 can record the first sequence number assigned to a first memory allocation requested by the action when it starts and can record the last sequence number assigned to the last memory allocation requested by the action before the action completes. In addition, an identifier that identifies the action can be recorded. Finally, the callstack associated with the current iteration of the action can be recorded. This information can be stored in a recorded tag information store such as recorded tag information store 126. This process can be repeated every time an action is iterated. For example, if the action is repeated n times, the tag information (e.g., callstack, beginning and ending sequence number and action identifier) can be recorded n times. If more than one action is tested within a session, each different action can be assigned an identifier. The action identifier can also be recorded.

Figure 2A:
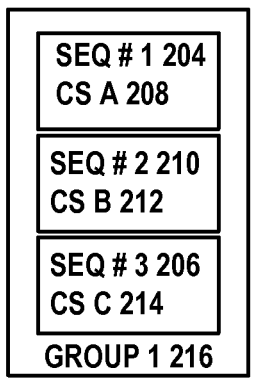
FIG. 2a illustrates an example of grouping memory allocation tag information by sequence numbers associated with each repetition of an action in accordance with aspects of the subject matter disclosed herein.
Figure 2A:
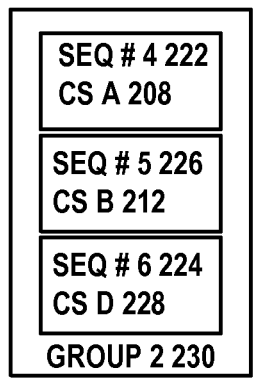
Figure 2A:
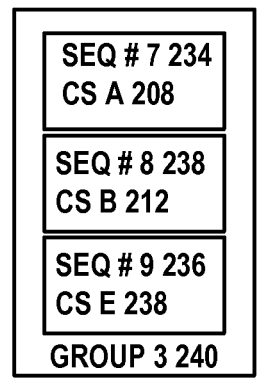

After the information has been recorded, an analysis module such as analysis module 110 can find all memory allocations tagged with sequence numbers that fall between the beginning and ending sequence number for an iteration of the action and group these memory allocations together, e.g. in group iterations information store 128. FIG. 2a illustrates an example of a result 200 of grouping iterations of an action. In FIG. 2a a first iteration of an action (e.g., Action 1 202, iteration 1 218) has a beginning sequence number 1 204 and an ending sequence number 3 206. Sequence number 1 204 is associated with Callstack A 208. Sequence number 2 210 is associated with Callstack B 212 and sequence number 3 206 is associated with Callstack C 214 in group 1 216. A second iteration of the action (e.g., Action 1 202, iteration 2 220) has a beginning sequence number 4 222 and an ending sequence number 6 224. Sequence number 4 222 is associated with another instance of Callstack A 208. Sequence number 5 226 is associated with another instance of Callstack B 212 and sequence number 6 224 is associated with Callstack D 228 in group 2 230. A third iteration of the action (e.g., Action 1 202, iteration 3 232) has a beginning sequence number 7 234 and an ending sequence number 9 236. Sequence number 7 234 is associated with another instance of Callstack A 208. Sequence number 8 238 is associated with another instance of Callstack B 212 and sequence number 9 236 is associated with Callstack E 228 in group 3 240.

Figure 2B:
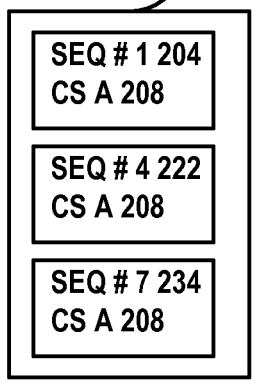
FIG. 2b illustrates an example of grouping memory allocation tag information by matching or substantially similar callstacks in accordance with aspects of the subject matter disclosed herein.
Figure 2B:
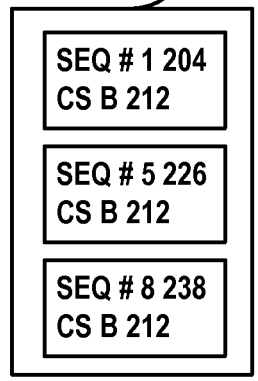

After all the repetitions of the action have been grouped by iteration (e.g., by ranges of sequence numbers), each memory allocation from the first group can be examined and all the allocations that have matching callstacks in the other n iterations can be found. If there is at least one matching allocation (e.g., at least one matching callstack is found in at least one other group) a leak group can be created for that set of matching callstacks. All the matching allocations can be grouped together in leak groups such as leak group 1 129, etc. FIG. 2b illustrates an example 250 following from the example 200 illustrated in FIG. 2a in which matching allocations are grouped together. The first allocation in the first iteration of action 1, group 1 216 is the memory allocation that is tagged with sequence number 1 204 and callstack A 208. An instance of callstack A is also found in group 2 230 (e.g., the memory allocation tagged with sequence number 4 222) and in group 3 240 (e.g., the memory allocation tagged with sequence number 7 234). Therefore, because these instances of the call stack match, these memory allocations are grouped together in leak group 1 252 of FIG. 2b.

The next allocation in group 1 216 is the allocation associated with callstack B 212 sequence number 2 210. An instance of callstack B 212 can be found in the second iteration (iteration 2 220) of action 1 220 group 2 230 in the memory allocation associated with sequence number 5 226.

In the third iteration (iteration 3 232) of action 1 202 group 3 240, another instance of callstack B 212 can be found in the memory allocation associated with sequence number 8, 238. Because these instances of the callstack match, these memory allocations are grouped together in leak group 2 254 of FIG. 2b. The third memory allocation in the first iteration of action 1, group 1 216 is the memory allocation that is tagged with sequence number 3 206 and callstack C 214. There are no matching callstacks in the other iterations of action 1 202 so this memory allocation is not defined as a leak.

The first memory allocation of the next iteration of action 1, group 2 230 is associated with callstack A 208 which has already been processed. The next memory allocation of action 1 202 group 2 230 is associated with callstack B 212 which has already been processed. The final memory allocation of action 1 202 group 2 230 is the memory allocation associated with Callstack D 228. There are no matching callstacks in the other iterations of action 1 202 so this memory allocation is not defined as a leak.

The first memory allocation of the next iteration of action 1, group 3 240 is associated with callstack A 208 which has already been processed. The next memory allocation of action 1 202 group 3 240 is associated with callstack B 212 which has already been processed. The final memory allocation of action 1 202 group 3 240 is the memory allocation associated with Callstack E 238. There are no matching callstacks in the other iterations of action 1 202 so this memory allocation is not defined as a leak. It will be appreciated that although the example shows three iterations that each request three memory allocations, any number of repetitions and memory allocation requests are possible. Display module 112 can display information associated with the memory leak groups (e.g., leak group information 129, etc.) in a user interface or display such as display 130. The information displayed can identify the action associated with the memory leak.

Matching callstacks can be identical, meaning that each frame of one callstack is the same as the corresponding frame of the other callstack. Matching callstacks can be substantially similar, meaning that a specified percentage of the frames of the two callstacks are identical. Suppose for example, a first callstack comprises frames a, b, c, d, e, and f and a second callstack comprises frames a, b, c, g, d, e, f and a specified percentage is 75%. The first three frames of the two callstacks are identical and the last three frames of the two callstacks are identical. Because the percentage of identical frames in the two callstacks exceeds the specified percentage (75%), the two callstacks are defined to be matching. It will be appreciated that the example is meant to be illustrative and is not meant to be limiting. Callstacks can include any number of frames, various algorithms can be employed to determine a percentage of identical frames in callstacks and various percentages of identical frames can be specified to determine if particular callstacks are matching or unmatching callstacks. Moreover, the percentage of identical frames needed for a first callstack to be defined as matching a second callstack can be user-specified.

Figure 2C:
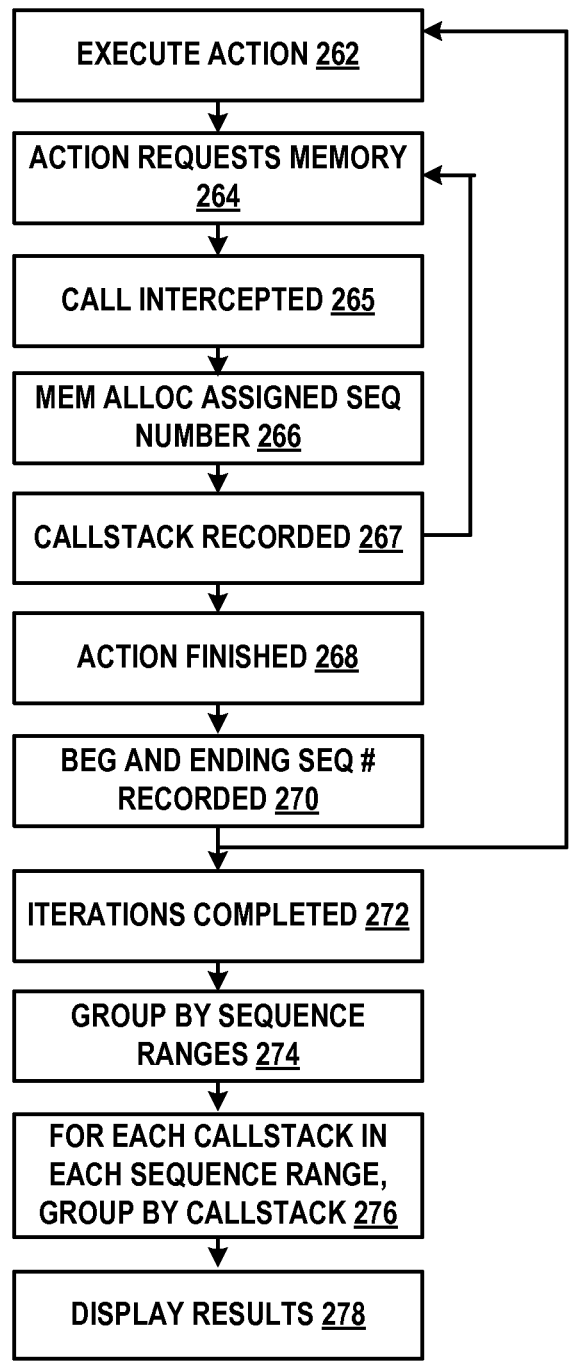
FIG. 2c is an example of a method for automating memory leak detection in accordance with aspects of the subject matter disclosed herein.

FIG. 2c illustrates a method 260 that automates memory leak detection in accordance with aspects of the subject matter disclosed herein. The method described in FIG. 2c can be practiced by a system such as but not limited to the one described with respect to FIG. 1. Some of the actions described below can be optional. Some of the actions described below can be executed in a sequence that differs from that described below.

A process can be initiated and at 262 an action within the process can be executed. For example, the process can be editing a document and the action can be an undo action. The action that is initiated can be an action that is to be checked for leaking memory. At 264 the action can request the operating system to allocate memory. At 265 the call can be intercepted by a module that monitors the process and intercepts calls that request memory or that intercepts calls that request that allocated memory is freed. At 266 a sequence number can be assigned to the memory allocation. The sequence number can be a sequential number that increases with time so that memory allocations to which are assigned sequence numbers can be ordered by time. For example, a memory allocation that occurred at time $t_0$ will have a sequence number that is less than a sequence number assigned to a memory allocation that occurred at time $t_1$ when time $t_0$ is less than (earlier than) time $t_1$.

The callstack associated with the memory allocation can also be recorded at 267. An action may request memory allocations one or more times. Each time the action requests a memory allocation, an incremented sequence number can be assigned to the memory allocation and the assigned sequence number and associated callstack can be recorded by returning to the processing performed at 264. At 268 the action is complete. At 270 the beginning and ending sequence numbers for the memory allocations requested by the action can be recorded. It will be appreciated that alternatively, the beginning sequence number can be recorded before the action begins. The beginning sequence number is the sequence number assigned to the last intercepted memory allocation. Alternatively, all the sequence numbers for memory allocations requested by the action can be recorded. The action can be repeated n times by returning to 262 n−1 times. When n iterations have been completed by returning to 262 n−1 times, the iterations of the action are complete at 272. An analysis module can examine the recorded data and can group memory allocations by sequence ranges comprising the memory allocations associated with each iteration of the action at 274. At 276, for each callstack in each sequence range, similar or identical callstacks can be grouped together, as described above. Callstacks which do not have similar or matching callstacks in other iterations can be discarded. At 278 the analyzed data can be displayed in a user interface, printed or otherwise output to the user. The information displayed can provide guidance concerning locations in source code that can be examined for memory leaks.

It will be appreciated that although described in the context of memory allocations, the concepts described herein can be applied more generally to any data that records and associates callstacks with sequence numbers and is not limited to use with memory allocations.

Example of a Suitable Computing Environment

Figure 3:
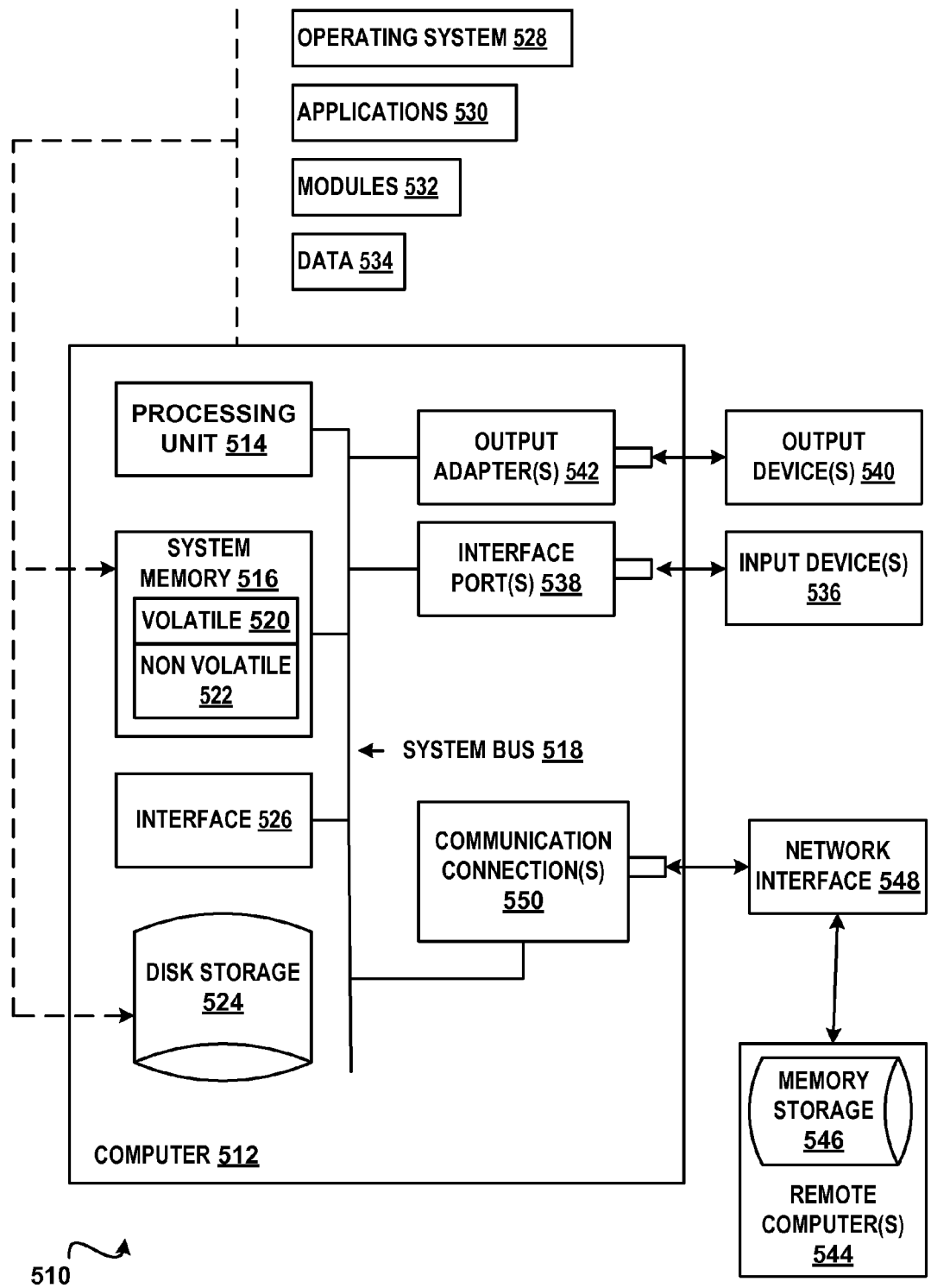
FIG. 3 is a block diagram of an example of a computing environment in accordance with aspects of the subject matter disclosed herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments.

The computing environment 510 is only one example of a suitable operating environment and is not intended to limit the scope of use or functionality of the subject matter disclosed herein.

With reference to FIG. 3, a computing device in the form of a computer 512 is described. Computer 512 may include a processing unit 514, a system memory 516, and a system bus 518. The processing unit 514 can be any of various available processors. Dual microprocessors and other multiprocessor architectures also can be employed as the processing unit 514. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures.

Computer 512 typically includes a variety of computer readable media such as volatile and nonvolatile media, removable and non-removable media. Computer storage media may be implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other transitory or non-transitory medium which can be used to store the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
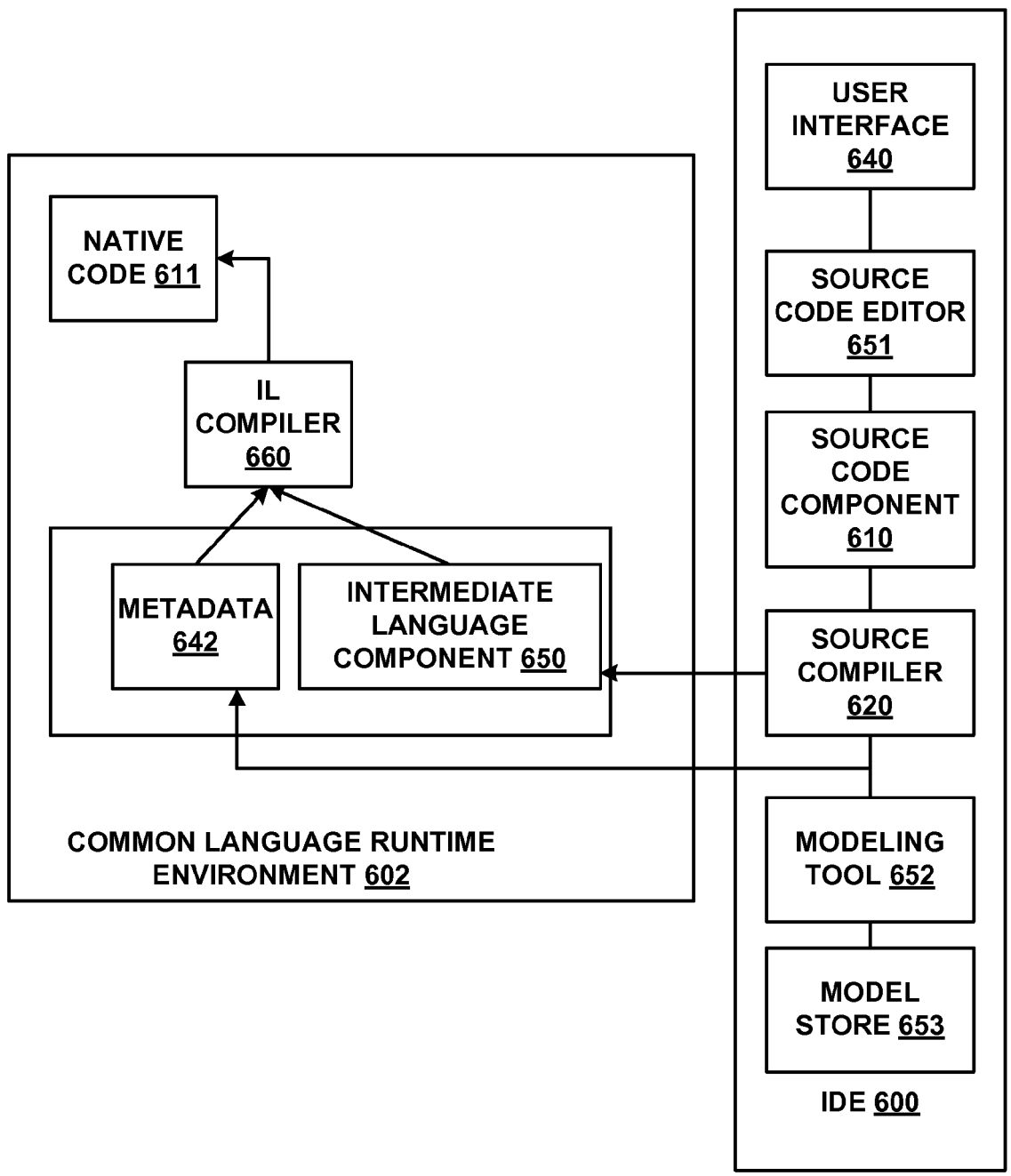
FIG. 4 is a block diagram of an example of an integrated development environment in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++. Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the .NET framework. An intermediate language component 650 may be created from the source code component 610 and the native code component 611 using a language specific source compiler 620 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or, software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
   at least one processor of a computing device;
   a memory of the computing device; and
   at least one module loaded into the memory causing the at least one processor to:
   intercept at least one call resulting from an execution of an action, the at least one call requesting an allocation of memory;
   assign a sequential sequence number to each memory allocation requested by the action;
   record at least a beginning sequence number and an ending sequence number assigned to memory allocations requested by the action;
   record each callstack associated with each memory allocation for each memory allocation requested by the action; and
   group memory allocations by a range of sequence numbers delimited by the recorded beginning sequence number and the recorded ending sequence number assigned to memory allocations requested by an iteration of the action.

2. The system of claim 1, further comprising:
   repeating the action at least one time, each repetition of the action comprising an iteration of the action.

3. The system of claim 2, further comprising:
   at least one module that groups memory allocations by iteration by placing all memory allocations that fall in the delimited range of sequence numbers of a first iteration in a first group and by placing all memory allocations that fall in a delimited range of sequence numbers for a second iteration in a second group.

4. The system of claim 3, further comprising:
   at least one module that examines a first callstack of a plurality of callstacks associated with the first iteration of the action and groups a matching callstack from a second iteration of the action with the first callstack associated with the first iteration in a first leak group.

5. The system of claim 4, further comprising:
   examining a second callstack of the plurality of callstacks associated with the first iteration of the action and grouping a matching callstack from the second iteration of the action with the second callstack associated with the first iteration in a second leak group.

6. The system of claim 4, further comprising:
   defining a first callstack as matching a second callstack when a first callstack has a specified percentage of frames that are identical to frames in the second callstack.

7. The system of claim 1, further comprising:
   at least one module that displays information identifying the action associated with at least one leak group in a user interface.

8. A method performed by a computing device having a processor, the method comprising:
   monitoring calls for memory allocation from an action executed by the processor during a plurality of iterations of the action;
   in response to each of the monitored calls for memory allocation, with the processor, allocating the requested memory;
   assigning a sequence number to the each of the monitored calls for memory allocation; and
   recording information of an instance of a callstack corresponding to the each of the calls for memory allocation;
   organizing, in groups corresponding to each of the iterations of the action, the monitored calls for memory allocation with the corresponding assigned sequence numbers and the recorded information of the instances of the callstack; and
   identifying one or more of the monitored calls as being related to a memory leak based on a similarity of the recorded information of the corresponding instances of the callstack in the different groups.

9. The method of claim 8, further comprising:
   recording a beginning sequence number and an ending sequence number for each of the plurality of iteration of the action executed by the processor; and
   wherein organizing includes organizing, in groups corresponding to each of the iterations of the action, the monitored calls for memory allocation with the corresponding assigned sequence numbers and the recorded information of the instances of the callstack according to the recorded beginning and ending sequence numbers.

10. The method of claim 8 wherein identifying the one or more of the monitored calls as being related to a memory leak includes:
    performing a comparison of the recorded information of the instances of the callstack in the different groups;
    based on the performed comparison, determining if the recorded information of one of the instances of the callstack in one of the groups is the same or substantially similar to another one of the instances of the callstack in another one of the groups; and in response to determining that the recorded information of one of the instances of the callstack in one of the groups is the same or substantially similar to another one of the instances of the callstack in another one of the groups, indicating that the corresponding monitored calls as being related to a memory leak.

11. The method of claim 8 wherein identifying the one or more of the monitored calls as being related to a memory leak includes:

performing a comparison of the recorded information of the instances of the callstack in the different groups;

based on the performed comparison, determining if the recorded information of one of the instances of the callstack in one of the groups is the same or substantially similar to another one of the instances of the callstack in another one of the groups; and in response to determining that the recorded information of one of the instances of the callstack in one of the groups is the same or substantially similar to another one of the instances of the callstack in another one of the groups, identifying the corresponding monitored calls with corresponding sequence numbers as being related to a memory leak.

12. The method of claim 8 wherein identifying the one or more of the monitored calls as being related to a memory leak includes:

performing a comparison of the recorded information of the instances of the callstack in the different groups;

based on the performed comparison, determining if the recorded information of one of the instances of the callstack in one of the groups is the same or substantially similar to another one of the instances of the callstack in another one of the groups; and in response to determining that the recorded information of one of the instances of the callstack in one of the groups is the same or substantially similar to another one of the instances of the callstack in another one of the groups, indicating that the corresponding monitored calls as being related to a memory leak and grouping the corresponding monitored calls according to the information of the one of the instances of the callstack.

13. The method of claim 8 wherein identifying the one or more of the monitored calls as being related to a memory leak includes:

performing a first comparison of the recorded information of a first instance of the callstack in a first one of the groups and of a second instance of the callstack in a second one of the groups;

based on the performed comparison, determining if the recorded information of the first instance of the callstack in the first one of the groups is the same or substantially similar to the second instance of the callstack in the second one of the groups; and in response to determining that the recorded information of the first instance of the callstack in the first one of the groups is the same or substantially similar to the second instance of the callstack in the second one of the groups, indicating that the corresponding monitored calls as being related to a memory leak and associating the corresponding monitored calls with a leak group.

14. The method of claim 13, further comprising:

performing a second comparison of the recorded information of the first instance of the callstack in the first one of the groups and of a third instance of the callstack in a third one of the groups;

based on the performed comparison, determining if the recorded information of the first instance of the callstack in the first one of the groups is the same or substantially similar to the third instance of the callstack in the third one of the groups; and in response to determining that the recorded information of the first instance of the callstack in the first one of the groups is the same or substantially similar to the third instance of the callstack in the third one of the groups, indicating that the monitored call corresponding to the third instance of the callstack as being related to a memory leak and associating the monitored call corresponding to the third instance of the callstack with the leak group.

15. The method of claim 8 wherein:

the individual instances of the callstack include a plurality of frames;

identifying the one or more of the monitored calls as being related to a memory leak includes:

determining a percentage of identical frames in the first instance of the callstack in a first one of the groups and a second instance of the callstack in a second one of the groups;

determining if the percentage of identical frames is above a threshold; and in response to determining that the derived percentage of identical frames is above the threshold, indicating that the monitored calls corresponding to the first and second instances of the callstack as being related to a memory leak.

16. The method of claim 8, further comprising:

performing comparisons of the recorded information of one of the instances of the callstack in one of the groups with other instances in the other groups;

based on the performed comparison, determining if the recorded information of the one of the instances of the callstack in the one of the groups is the same or substantially similar to at least one of the instances of the callstack in the other groups; and in response to determining that the recorded information of the one of the instances of the callstack in the one of the groups is not the same or substantially similar to any one of the instances of the callstack in the other groups, indicating that the corresponding monitored call is not related to a memory leak.

17. A computing system, comprising:

a processor; and a memory having instructions that when executed by the processor, cause the processor to perform a method comprising:

executing an action of a computer process;

monitoring calls for memory allocation from the action during execution;

in response to each monitored call for memory allocation, recording information of an instance of a callstack corresponding to the each monitored call;

repeating the executing, monitoring, and recording for a plurality of iterations;

organizing, in groups corresponding to each of the iterations of the action, the monitored calls for memory allocation and the corresponding recorded information of the instances of the callstack;

determining if one of the instances of the callstack in one of the groups is the same or substantially similar to any other instances of the callstack in other groups; and in response to determining that the one of the instances of the callstack in one of the groups is the same or substantially similar to at least one other instance of the callstack in another group, indicating that the corresponding monitored calls as being related to a memory leak.

18. The computing system of claim 17 wherein:

the instances of the callstack individually include a plurality of frames; and determining if one of the instances of the callstack in one of the groups is the same or substantially similar to any other instances of the callstack in other groups includes:

deriving a percentage of identical frames in the one of the instances of the callstack in one of the groups and another one of the instances of the callstack in another one of the groups;

determining if the derived percentage of identical frames is above a threshold; and in response to determining that the derived percentage of identical frames is above the threshold, indicating that the one of the instances of the callstack is substantially similar to the another one of the instances of the callstack in the another one of the groups.

19. The computing system of claim 17 wherein:

the instances of the callstack individually include a plurality of frames; and determining if one of the instances of the callstack in one of the groups is the same or substantially similar to any other instances of the callstack in other groups includes:

determining if the frames in the one of the instances of the callstack in one of the groups are identical to those in another one of the instances of the callstack in another one of the groups; and in response to determining that the frames in the one of the instances of the callstack in one of the groups are identical to those in another one of the instances of the callstack in another one of the groups, indicating that the one of the instances of the callstack is the same as the another one of the instances of the callstack in the another one of the groups.

20. The computing system of claim 17 wherein the method performed by the processor further includes in response to determining that the one of the instances of the callstack in one of the groups is not the same or substantially similar to at least one other instance of the callstack in another group, indicating that the corresponding monitored call is not related to a memory leak.

* * * * *